United States Patent
Han et al.

(10) Patent No.: US 11,780,423 B2
(45) Date of Patent: Oct. 10, 2023

(54) SYSTEM AND METHOD FOR DETERMINING WHETHER TO START ENGINE

(71) Applicants: HYUNDAI MOTOR COMPANY, Seoul (KR); KIA CORPORATION, Seoul (KR)

(72) Inventors: Hoon Han, Hwaseong-si (KR); Kwon Chae Chung, Seoul (KR); Chun Hyuk Lee, Hwaseong-si (KR); Jae Young Choi, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 98 days.

(21) Appl. No.: 17/332,053

(22) Filed: May 27, 2021

(65) Prior Publication Data

US 2022/0144248 A1 May 12, 2022

(30) Foreign Application Priority Data

Nov. 9, 2020 (KR) .................. 10-2020-0148272

(51) Int. Cl.
*B60W 20/40* (2016.01)
*B60W 10/06* (2006.01)
*B60W 10/26* (2006.01)
*B60W 40/105* (2012.01)

(52) U.S. Cl.
CPC ............ *B60W 20/40* (2013.01); *B60W 10/06* (2013.01); *B60W 10/26* (2013.01); *B60W 40/105* (2013.01); *B60W 2510/0208* (2013.01); *B60W 2510/244* (2013.01)

(58) Field of Classification Search
CPC ...... B60W 20/40; B60W 10/06; B60W 10/26; B60W 40/105; B60W 2510/0208; B60W 2510/244; B60W 2540/12
See application file for complete search history.

(56) References Cited

U.S. PATENT DOCUMENTS

| | | | | |
|---|---|---|---|---|
| 6,359,345 B1 * | 3/2002 | Suzuki | .................. | B60K 6/543 290/40 C |
| 6,782,961 B1 * | 8/2004 | Ishikawa | ................ | B60K 28/16 180/197 |
| 2003/0062206 A1 * | 4/2003 | Fujikawa | ................. | B60K 6/54 903/917 |

(Continued)

*Primary Examiner* — Carl C Staubach
(74) *Attorney, Agent, or Firm* — MCDONNELL BOEHNEN HULBERT & BERGHOFF LLP

(57) ABSTRACT

The present disclosure provides a system and method for determining whether to start an engine. The system includes an engine configured to provide driving force for a vehicle through combustion of fuel, a motor configured to provide driving force for the vehicle using electrical energy, an engine clutch connecting the engine and a drive shaft, and a controller configured to control engagement of the engine clutch and starting of the engine. The controller calculates a predicted vehicle speed at the time of engagement of the engine clutch based on the current vehicle speed upon a request for passive run driving of the vehicle. The controller determines whether to start the engine by comparing the predicted vehicle speed with a reference vehicle speed.

18 Claims, 3 Drawing Sheets

(56) References Cited

U.S. PATENT DOCUMENTS

| | | | |
|---|---|---|---|
| 2009/0156355 A1* | 6/2009 | Oh | B60W 30/186 903/946 |
| 2009/0298641 A1* | 12/2009 | Boot | B60W 10/196 477/4 |
| 2013/0297161 A1* | 11/2013 | Gibson | F16H 61/21 180/65.265 |
| 2014/0329643 A1* | 11/2014 | Matsuo | F16H 61/0213 477/115 |
| 2015/0191168 A1* | 7/2015 | Mitsuyasu | F02D 13/06 701/54 |
| 2015/0298698 A1* | 10/2015 | Kim | F16D 48/066 701/48 |
| 2016/0236671 A1* | 8/2016 | Imamura | B60W 20/14 |
| 2019/0118820 A1* | 4/2019 | Akita | B60W 10/18 |
| 2020/0189556 A1* | 6/2020 | Burt | B60T 17/22 |
| 2021/0339757 A1* | 11/2021 | Rollinger | B60W 40/105 |

* cited by examiner

SYSTEM AND METHOD FOR DETERMINING WHETHER TO START ENGINE

CROSS REFERENCE TO RELATED APPLICATIONS

This application claims under 35 U.S.C. § 119(a) the benefit of priority to Korean Patent Application No. 10-2020-0148272 filed on Nov. 9, 2020, the entire contents of which are incorporated herein by reference.

BACKGROUND

(a) Technical Field

The present disclosure relates to a system and method for determining whether to start an engine, and more particularly, to a system and method for determining whether to start an engine based on the speed of a vehicle upon engagement of an engine clutch when passive run driving is requested.

(b) Background Art

Recently, interest has been focused on environmentally friendly vehicles due to the worldwide trend of increasingly stringent exhaust gas emission regulations for vehicles as concern about environmental problems has increased. In a narrow sense, a hybrid vehicle may be distinguished from a fuel cell vehicle and an electric vehicle, but in the present specification, a hybrid vehicle refers to a vehicle that uses an engine and a motor as power sources. That is, the hybrid vehicle includes a hybrid driving mode, which is an engine-driving mode, and an electric-vehicle (EV) driving mode, which is a motor-driving mode for reducing consumption of fuel. Further, the hybrid vehicle may switch a driving mode between the hybrid driving mode and the EV driving mode.

When the driving mode is switched to the EV driving mode, the vehicle is driven using the motor. Thus, disconnection between the engine, which does not provide driving force, and the driving unit is requested. That is, the engine clutch, which connects the engine and the driving unit, is disengaged. In contrast, when the hybrid vehicle enters a passive run state during the EV driving mode, the engine is started, and the engine clutch is engaged with the engine.

However, a certain time period is required until the hybrid control unit instructs engagement of the engine clutch and the engine clutch is actually engaged. During the certain time period, the speed of the vehicle may decrease. After the hybrid vehicle enters the passive run state, passive run driving may not be demanded when the engine clutch is actually engaged with the engine due to sudden deceleration of the vehicle. In this case, the engine is started when the hybrid vehicle enters the passive run state, and is turned off when the engine clutch is actually engaged with the engine. That is, the engine is turned on/off within a short time, thus giving a feeling of discomfort to the driver and wasting fuel due to unnecessary starting of the engine.

The above information disclosed in this Background section is only for enhancement of understanding of the background of the disclosure, and therefore it may contain information that does not form the related art that is already known in this country to a person of ordinary skill in the art.

SUMMARY

The present disclosure has been made in an effort to solve the above-described problems associated with the related art, and it is an object of the present disclosure to provide a system and method for determining whether to start an engine of a vehicle in order to prevent unnecessary on/off operation of the engine when passive run driving is requested.

In one aspect, the present disclosure provides a system for determining whether to start an engine, the system including an engine configured to provide driving force for a vehicle through combustion of fuel, a motor configured to provide driving force for the vehicle using electrical energy, an engine clutch connecting the engine and a drive shaft, and a controller configured to control engagement of the engine clutch and starting of the engine, wherein the controller may calculate a predicted vehicle speed at the time of engagement of the engine clutch based on the current vehicle speed upon a request for passive run driving of the vehicle, and the controller may determine whether to start the engine by comparing the predicted vehicle speed with a reference vehicle speed.

In a preferred embodiment, the predicted vehicle speed may be the sum of the current vehicle speed and a value obtained by multiplying deceleration of the vehicle by the time taken for the engine clutch to engage.

In another preferred embodiment, the controller may predict the rate of increase in the RPM of the engine at the time of engagement of the engine clutch based on the current RPM of the motor, and the time taken for the engine clutch to engage may be a value obtained by dividing the current RPM of the motor by the rate of increase in the RPM of the engine.

In still another preferred embodiment, the reference vehicle speed may be a preset vehicle speed for each gear stage of the vehicle, and the reference vehicle speed may be preset to a lower speed for a lower gear stage.

In yet another preferred embodiment, the controller may calculate a vehicle speed error value according to variation in deceleration of the vehicle, the braking amount, or the extent of operation of a brake pedal, and the controller may set the reference vehicle speed as a value obtained by adding a preset vehicle speed for each gear stage of the vehicle to the vehicle speed error value.

In still yet another preferred embodiment, the controller may calculate a vehicle speed error value that is proportional to the absolute value of the deceleration, and when the deceleration has a negative value, the vehicle speed error value may have a positive value.

In a further preferred embodiment, the controller may calculate a vehicle speed error value that is proportional to the extent of operation of the brake pedal or the braking amount.

In another further preferred embodiment, the controller may determine whether a passive run driving condition of the vehicle is satisfied based on at least one piece of information among the state of charge (SOC) of a battery of the vehicle, the result of determining whether charging of the battery is restricted, and a request for downshifting.

In still another further preferred embodiment, the controller may calculate a target gear stage to be engaged upon a request for downshifting by a driver, and the controller may compare a preset reference vehicle speed corresponding to the target gear stage with the predicted vehicle speed.

In yet another further preferred embodiment, when the SOC of the battery is a fully charged state or when charging of the battery is restricted, the controller may compare a preset reference vehicle speed corresponding to the current gear stage of the vehicle with the predicted vehicle speed.

In still yet another further preferred embodiment, the passive run driving may be a driving state in which deceleration is generated through the engine, and when the passive run driving continues, the deceleration of the vehicle is generated through engagement of the engine clutch.

In a still further preferred embodiment, when the predicted vehicle speed is less than or equal to the reference vehicle speed, the controller may determine that the passive run driving is not necessary, and may not start the engine.

In another aspect, the present disclosure provides a method of determining whether to start an engine, the method including determining a passive run driving condition of a vehicle, predicting the time at which an engine clutch is expected to be engaged with an engine upon a request for passive run driving, calculating a predicted vehicle speed at the time at which the engine clutch is expected to be engaged with the engine based on the current vehicle speed upon a request for the passive run driving, and determining whether to start the engine by comparing the predicted vehicle speed with a reference vehicle speed.

In a preferred embodiment, the determining the passive run driving condition may include determining whether the passive run driving condition is satisfied based on at least one piece of information among the state of charge (SOC) of a battery of the vehicle, the result of determining whether charging of the battery is restricted, and a request for downshifting.

In another preferred embodiment, the predicting the time at which the engine clutch is expected to be engaged with the engine upon a request for the passive run driving may include predicting the rate of increase in the RPM of the engine at the time of engagement of the engine clutch based on the current RPM of a motor, and calculating the time taken for the engine clutch to engage by dividing the current RPM of the motor by the rate of increase in the RPM of the engine.

In still another preferred embodiment, the calculating the predicted vehicle speed may include calculating the predicted vehicle speed by adding a value obtained by multiplying deceleration of the vehicle by the time taken for the engine clutch to engage to the current vehicle speed.

In yet another preferred embodiment, in the controlling whether to start the engine, when the predicted vehicle speed is less than or equal to the reference vehicle speed, it may be determined that the passive run driving is not necessary, and the engine may not be started.

In still yet another preferred embodiment, the reference vehicle speed may be a value obtained by adding a vehicle speed error value calculated according to variation in deceleration of the vehicle, the braking amount, or the extent of operation of a brake pedal to a preset vehicle speed for each gear stage of the vehicle.

In a further preferred embodiment, a gear stage at which the reference vehicle speed is calculated may be a target gear stage to be engaged upon a request for downshifting by a driver.

In another further preferred embodiment, when a request for the passive run driving is made due to the state in which the battery of the vehicle is fully charged or the state in which charging of the battery is restricted, the reference vehicle speed may be a preset vehicle speed according to the current gear stage of the vehicle.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
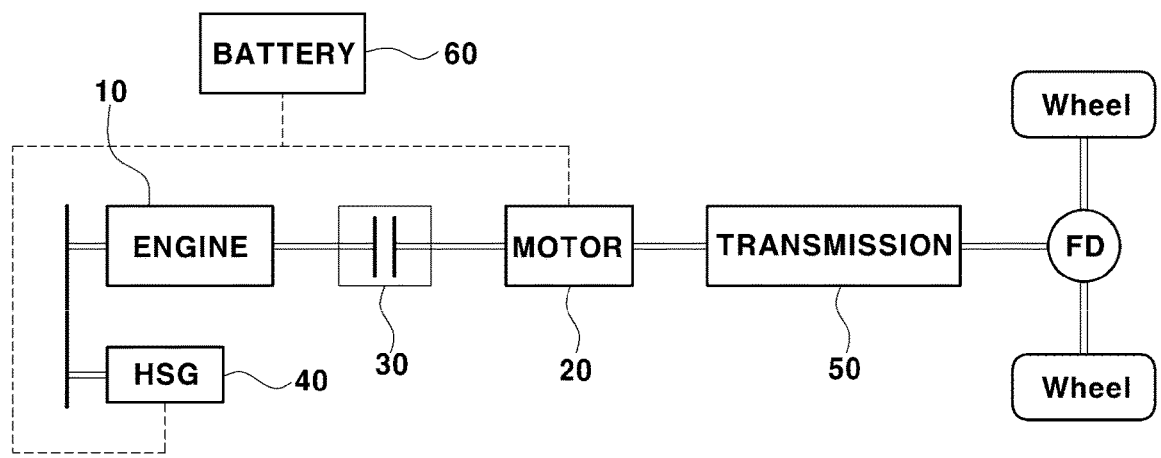
FIG. 1 is a diagram showing the configuration of a powertrain of a hybrid vehicle according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving them will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. Throughout the specification, the same reference numerals represent the same components.

The terms "-part", "-unit", and "-module" described in the specification mean units for processing at least one function or operation, and can be implemented as hardware components, software components, or combinations of hardware components and software components.

Further, in the following description, the terms "first" and "second" are used only to avoid confusing designated components, and do not indicate the sequence or importance of the components or the relationships between the components.

The above description is illustrative of the present disclosure. Also, the above disclosure is intended to illustrate and explain preferred embodiments of the present disclosure, and the present disclosure may be used in various other combinations, modifications, and environments. In other words, the present disclosure may be changed or modified within the scope of the concept of the disclosure disclosed herein, within the equivalent scope of the disclosure, and/or within the range of skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. Also, the appended claims should be construed as encompassing such other embodiments.

FIG. 1 is a diagram showing the configuration of a powertrain of a hybrid vehicle according to an embodiment of the present disclosure.

Referring to FIG. 1, a powertrain of a hybrid vehicle may include an engine 10, a motor 20, an engine clutch 30, a hybrid starter generator 40, and a transmission 50.

In the case of a hybrid vehicle, the engine 10 and the motor 20 may be arranged in series and used simultaneously in order to generate driving force. The engine 10 may consume fuel to provide driving force for the vehicle. The motor 20 may provide driving force to the vehicle using electrical energy. In a hybrid driving mode, fuel is consumed to drive the vehicle, and in an electric-vehicle (EV) driving mode, the motor 20 is used to drive the vehicle. The engine clutch 30 for selectively permitting or interrupting the transfer of power may be disposed between the engine 10 and the motor 20. The engine clutch 30 may be engaged (locked up) or disengaged (open) by hydraulic pressure, thereby connecting or disconnecting the engine 10 to or from a drive shaft. When the engine clutch 30 is engaged with the engine 10, the driving force generated from the engine 10 and the motor 20 may be transferred to wheels via the transmission 50. The transmission 50 is connected to the output side of the motor 20 to transfer the driving force from the engine 10 and the motor 20 to the drive shaft.

The hybrid starter generator 40 may serve as a motor when the engine 10 is started, and may serve as a generator when power generation is required. The hybrid starter generator 40 may be connected to a pulley (not shown) of the engine 10. In addition, the hybrid starter generator 40 may set the torque of the engine 10. The hybrid starter generator 40 may measure the real-time torque of the engine 10 and control the torque of the engine 10 using a pulley (not shown) connected to the engine 10.

The battery 60 may provide electrical energy to the motor 20. The battery 60 may be charged by the motor 20 depending on the state of charge (SOC) of the battery when the vehicle is coasting. The term "coasting" means that the driver drives the vehicle using the inertia of the vehicle without applying any pressure on the accelerator pedal or applying any pressure on the brake pedal. During coasting, an inverter (not shown) connected to the motor 20 may charge the battery 60.

When the hybrid vehicle is driven in the hybrid driving mode, the engine clutch 30 may be engaged with the engine 10. When the hybrid vehicle is driven in the EV driving mode, the engine clutch 30 may be disengaged from the engine 10. That is, in the EV driving mode, the engine clutch 30, which is disposed between the engine 10 and the motor 20, may be disengaged, and the drive shaft may be connected only to the motor 20. For reference, when the vehicle is driven in the EV driving mode with the engine clutch disengaged (open), the vehicle may coast due to the inertia of the vehicle in the off state of the brake pedal and the accelerator pedal, and the regenerative power (charging power) from the motor 20 may be stored in the battery 60 via the inverter (not shown). At this time, the motor torque (coasting torque) may be controlled based on an engine friction torque corresponding to the current speed of the input shaft of the transmission (=transmission input speed).

For example, while the hybrid vehicle is driven in the EV driving mode, when the driver requests downshifting, when the SOC of the battery 60 is a fully charged state, or when the charging of the battery 60 is restricted, the vehicle may enter a passive run state. The term "passive run driving" may mean a driving state in which deceleration is generated through the engine 10. In other words, "passive run driving" may mean a driving state in which the engine 10 and the engine clutch 30 are engaged and thus engine braking is activated during the EV driving mode. When the passive run driving continues, the vehicle may decelerate due to engagement of the engine clutch 30, and fuel cut control may be performed in order to stop the supply of fuel to the engine 10.

Figure 2:
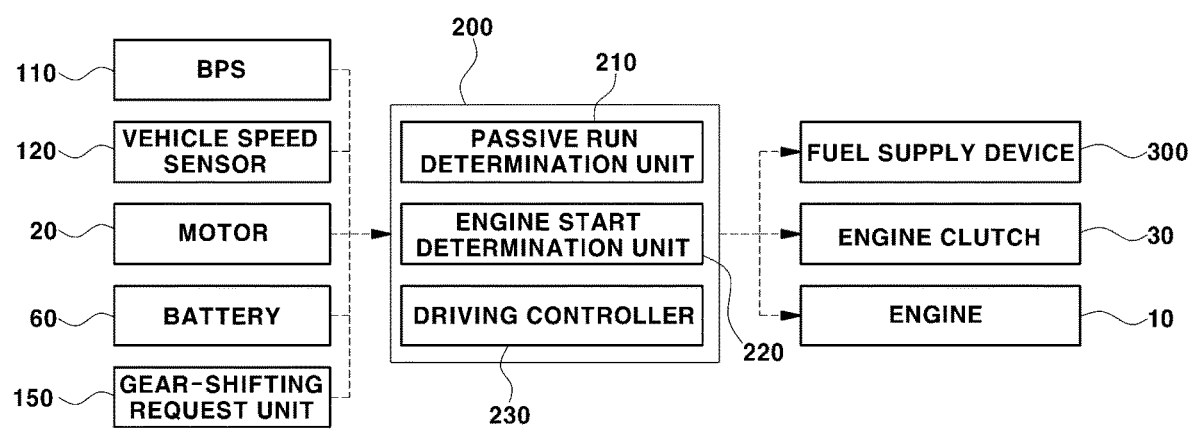
FIG. 2 is a block diagram showing a system for determining whether to start an engine according to an embodiment of the present disclosure.

FIG. 2 is a block diagram showing a system for determining whether to start an engine according to an embodiment of the present disclosure.

Referring to FIGS. 1 and 2, the hybrid vehicle may include a controller 200 for setting the hybrid driving mode or the EV driving mode of the vehicle. For example, the controller 200 may be a hybrid control unit (HCU). The controller 200 may calculate a predicted vehicle speed at the time of engagement of the engine clutch 30 based on the current vehicle speed upon a request for passive run driving of the vehicle, and may control starting of the engine 10 by comparing the predicted vehicle speed with a reference vehicle speed. To this end, a variety of pieces of information about the vehicle may be transmitted to the controller 200.

A brake pedal sensor (BPS) 110 may detect the extent to which the brake pedal is depressed. The extent of operation of the brake pedal measured by the BPS 110 may be transmitted to the controller 200. The controller 200 may calculate the braking amount based on the extent of operation of the brake pedal.

A vehicle speed sensor 120 may be a sensor that measures the speed of the vehicle. For example, the vehicle speed sensor 120 may include a sensor that measures the wheel speed of the vehicle. The vehicle speed measured by the vehicle speed sensor 120 may be transmitted to the controller 200. The controller 200 may calculate the deceleration of the vehicle based on variation in the vehicle speed.

The motor 20 may transmit information on the number of revolutions per minute (RPM) of the motor 20 to the controller 200. As one example, the controller 200 may calculate, based on the information on the RPM of the motor 20, the time period from the occurrence of a request for passive run driving until the engine clutch 30 is engaged with the engine 10. As another example, the controller 200 may calculate the torque of the motor 20 based on information on the current RPM of the motor 20, and may calculate the deceleration of the vehicle based on information on the torque of the motor 20, the rotational inertia of the engine 10, the rotational inertia of the motor 20, the rotational inertia of the drive train, the rotational inertia of the vehicle, the friction torque of the engine 10, the friction torque of the drive train, and the traveling load of the vehicle. In addition, when the motor 20 is in a state in which regenerative braking is restricted, the motor 20 may transmit information thereon to the controller 200.

The battery 60 may transmit information on the state of charge (SOC) thereof to the controller 200. The controller 200 may determine whether the battery 60 is fully charged based on the SOC of the battery 60. Upon determining that the battery 60 is in the fully charged state, the controller 200 may determine that the regenerative braking of the motor 20 is restricted and the charging of the battery 60 is restricted.

A gear-shifting request unit 150 may transmit a driver's request for downshifting to the controller 200. For example, the request for downshifting may include a request for downshifting by manual operation of a gear lever or a request for downshifting by operation of a paddle shifter. That is, the gear-shifting request unit 150 may include a gear lever and a paddle shifter mounted in the vehicle.

In addition, the controller 200 may receive information on the amount of torque of the engine 10 and the real-time rate of change in torque of the engine 10 through the hybrid starter generator 40 connected to the engine 10.

The controller 200 may include a passive run determination unit 210, an engine start determination unit 220, and a driving controller 230. The passive run determination unit 210, the engine start determination unit 220, and the driving controller 230 may be components to be classified according to the function of the controller 200.

The passive run determination unit 210 may determine whether a passive run driving condition of the vehicle is satisfied based on at least one piece of information among the SOC of the battery 60, the result of determining whether charging of the battery 60 is restricted, and a request for downshifting. As one example, when the SOC of the battery 60 is a fully charged state or when charging of the battery 60 is restricted, a dragging sensation is not generated by the motor 20. Therefore, the controller 200 generates a dragging sensation by engaging the engine clutch 30 with the engine 10. As another example, when the vehicle is driven in the EV driving mode and there is a driver's request for downshifting, the controller 200 may engage the engine clutch 30 with the engine 10 in order to generate a dragging sensation through engine braking.

The engine start determination unit 220 may calculate a predicted vehicle speed at the time of engagement of the engine clutch 30 based on the current vehicle speed upon a request for passive run driving of the vehicle, and may determine whether to start the engine 10 by comparing the predicted vehicle speed with a reference vehicle speed.

For example, Formula 1 below shows that the predicted vehicle speed may be the sum of the current vehicle speed and a value obtained by multiplying the deceleration of the vehicle by the time taken for the engine clutch to engage (hereinafter referred to as "clutch engagement time").

$$\text{predicted vehicle speed } (V_{new}) = \text{current vehicle speed } (V_0) + \text{deceleration } (a) \times \text{clutch engagement time } (\Delta t) \quad \text{Formula 1}$$

The clutch engagement time may be a value obtained by dividing the current RPM of the motor 20 by the rate of increase in the RPM of the engine 10. The rate of increase in the RPM of the engine 10 may be a rate of increase in the RPM of the engine 10 upon preset engagement of the engine clutch according to the current RPM of the motor 20. That is, the rate of increase in the RPM of the engine 10 may be determined based on a preset table according to the current RPM of the motor 20.

As one example, the reference vehicle speed may be a vehicle speed preset for each gear stage of the vehicle. In this case, the reference vehicle speed may be preset to a lower speed for a lower gear stage. As such, the reference vehicle speed varies depending on the gear stage of the vehicle. However, when the driver requests downshifting, the reference vehicle speed may vary depending on the target gear stage. The engine start determination unit 220 may calculate a target gear stage to be engaged upon a request for downshifting by the driver, and may compare the preset reference vehicle speed corresponding to the target gear stage with the predicted vehicle speed. For example, even if the driver requests downshifting by two gear stages, the gear stage may be lowered by only one gear stage in order to protect the transmission 50. Therefore, the engine start determination unit 220 may predict a target gear stage to be engaged upon a request for downshifting, rather than the gear stage according to the request for downshifting by the driver, and may calculate a reference vehicle speed corresponding to the target gear stage.

The engine start determination unit 220 may calculate a reference vehicle speed, which varies depending on variation in the deceleration of the vehicle, the braking amount, or the extent of operation of the brake pedal. The engine start determination unit 220 may calculate a vehicle speed error value according to variation in the deceleration of the vehicle, the braking amount, or the extent of operation of the brake pedal. The engine start determination unit 220 may set the reference vehicle speed as a value obtained by adding the preset vehicle speed for each gear stage of the vehicle to the vehicle speed error value.

As one example, the vehicle speed error value may increase as the absolute value of the deceleration increases. The vehicle speed error value and the absolute value of the deceleration may have a proportional relationship therebetween. When the deceleration has a negative value, the vehicle speed error value may have a positive value. In addition, when the deceleration is 0, the vehicle speed error value may be 0. That is, when the deceleration of the vehicle is high, the vehicle speed may rapidly decrease until the engine clutch 30 is engaged with the engine 10. As the vehicle speed decreases more rapidly, there is a higher possibility that the engine 10 is turned off within a short time after the engine 10 is turned on due to dissatisfaction with the passive run driving condition before the engine clutch 30 is engaged with the engine 10. Therefore, the engine start determination unit 220 may set the reference vehicle speed to a larger value as the absolute value of the deceleration is larger.

As one example, the braking amount or the extent of operation of the brake pedal may be proportional to the vehicle speed error value. The engine start determination unit 220 may determine variation in the extent of operation of the brake pedal based on the information received from the BPS 110, and may calculate the braking amount based on the variation in the extent of operation of the brake pedal. As the braking amount and the extent of operation of the brake pedal increase, the vehicle speed decreases more rapidly. Thus, there is a high possibility that the engine 10 is turned off within a short time after the engine 10 is turned on due to dissatisfaction with the passive run driving condition before the engine clutch 30 is engaged with the engine 10. Therefore, the engine start determination unit 220 may set the reference vehicle speed to a larger value as the braking amount and the extent of operation of the brake pedal are larger.

When the predicted vehicle speed is less than or equal to the reference vehicle speed, the engine start determination unit 220 may determine that passive run driving is not necessary, and may not start the engine 10. In other words, the engine start determination unit 220 may turn on the engine 10 when the predicted vehicle speed is greater than the reference vehicle speed. Conventionally, the engine 10 is started upon a request for passive run driving. However, the conventional art has a problem in which the engine 10 is frequently turned off because the passive run driving condition is not satisfied at the time of engagement of the engine clutch 30 with the engine 10 due to reduction in the vehicle speed. When the vehicle speed suddenly decreases, it is not necessary to generate a sense of drag of the vehicle, which may lead to dissatisfaction with the passive run driving condition. The controller 200 may start the engine 10 only when the vehicle is expected to satisfy the passive run driving condition at the time of engagement of the engine clutch 30 with the engine 10 by comparing the predicted vehicle speed, which is the vehicle speed at the time of engagement of the engine clutch 30 with the engine 10, with the reference vehicle speed, rather than comparing the current vehicle speed with the reference vehicle speed. To this end, the engine start determination unit 220 may compare the predicted vehicle speed with the reference vehicle speed.

When the engine start determination unit 220 determines that the predicted vehicle speed is greater than the reference vehicle speed, the driving controller 230 may turn on the engine 10 and engage the engine clutch 30 with the engine 10. The driving controller 230 may control the hybrid starter generator 40 in order to turn on the engine 10. Upon turning on the engine 10, the driving controller 230 may control a fuel supply device 300 such that fuel cut control is performed in order to stop the supply of fuel to the engine 10. However, when the engine start determination unit 220 determines that the predicted vehicle speed is less than the reference vehicle speed, the driving controller 230 may not turn on the engine 10. At this time, the driving controller 230 may not turn on the engine 10, and may not operate the hybrid starter generator 40.

Unlike the above-described example, upon a request for passive run driving, the controller 200 may output a command for engaging the engine clutch 30 with the engine 10. However, during the time in which the engine clutch 30 is engaged with the engine 10, the controller 200 may determine whether to start the engine 10 by comparing the predicted vehicle speed with the reference vehicle speed. When the predicted vehicle speed is less than or equal to the reference vehicle speed, the controller 200 may not turn on the engine 10. Even if the engine clutch 30 is engaged with the engine 10 in the off state of the engine 10, an unnecessary dragging sensation is not generated in the vehicle.

According to the embodiment of the present disclosure, it is possible to control engagement of the engine clutch 30 and starting of the engine 10 by comparing the predicted vehicle speed at the time of engagement of the engine clutch 30 with the engine 10 with the reference vehicle speed, which varies depending on the target gear stage. Accordingly, it is possible to prevent the engine 10 from being turned off within a short time after the engine 10 is turned on due to dissatisfaction with the passive run driving condition before the engine clutch 30 is engaged with the engine 10. As such, since unnecessary on/off operation of the engine 10 is prevented, it is possible to prevent the driver from feeling discomfort and to save the fuel used to start the engine 10 and the energy used to operate the hybrid starter generator 40, thereby improving the fuel efficiency of the vehicle.

According to the embodiment of the present disclosure, since the target gear stage, the deceleration of the vehicle, the braking amount, and the extent of operation of the brake pedal are considered when setting the reference vehicle speed, which is a factor for determining whether to start the engine 10, the reference vehicle speed may be calculated based on predicted variation in the vehicle speed. If the reference vehicle speed is calculated based on the current gear stage of the vehicle in the situation in which the vehicle speed rapidly decreases and thus engine braking is not demanded, the reference vehicle speed is less than the predicted vehicle speed, which may cause the engine 10 to be unnecessarily turned on. In order to prevent this, the controller 200 may set the reference vehicle speed to a larger value as the absolute value of the deceleration of the vehicle, the braking amount, and the extent of operation of the brake pedal are larger such that the reference vehicle speed is greater than or equal to the predicted vehicle speed even when the vehicle speed rapidly decreases. As a result, it is possible to prevent unnecessarily frequent on/off operation of the engine 10.

Figure 3:
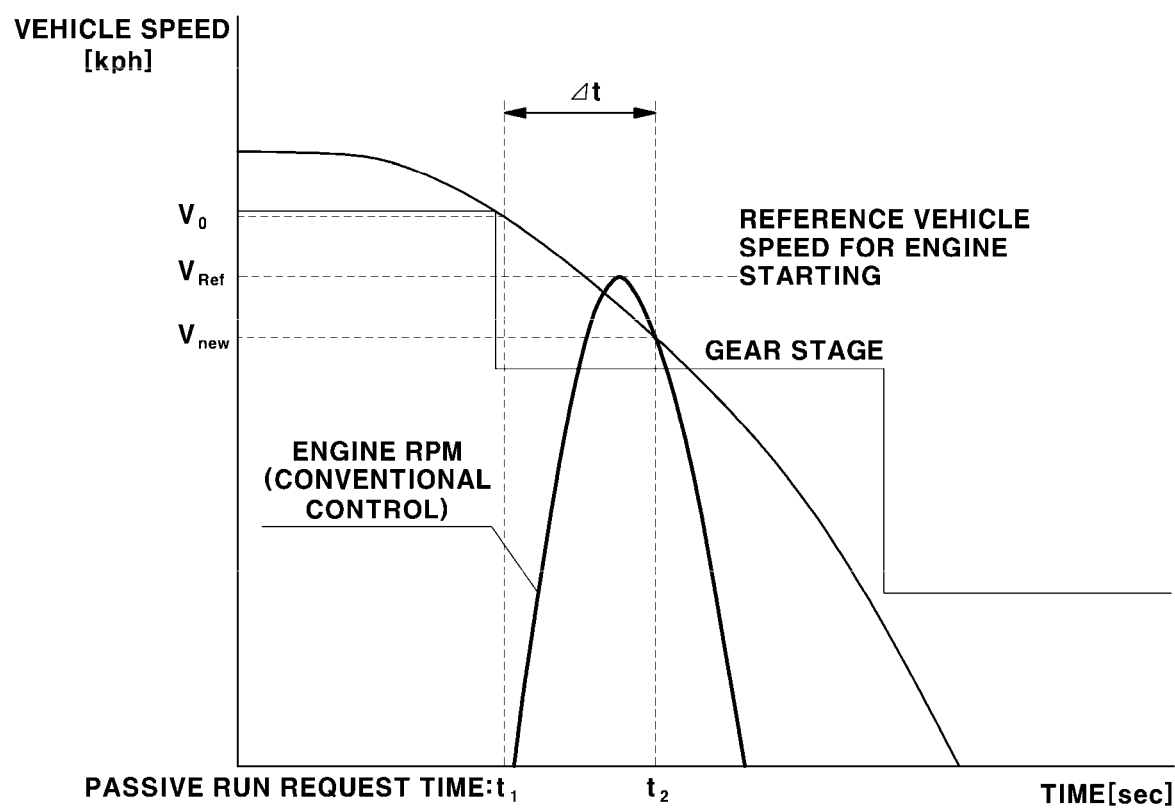
FIG. 3 is a graph showing a method of determining whether to start an engine according to an embodiment of the present disclosure.

FIG. 3 is a graph showing a method of determining whether to start an engine according to an embodiment of the present disclosure. For the sake of simplicity, a description of the same contents as above will be omitted.

Referring to FIGS. 1 to 3, the controller 200 may calculate, based on the information on the RPM of the motor 20, the time period from the occurrence of a request for passive run driving until the engine clutch 30 is engaged with the engine 10. Specifically, the time taken for the engine clutch 30 to engage may be calculated based on the current RPM of the motor 20 and the preset rate of increase in the RPM of the engine 10 according to the current RPM of the motor 20. In FIG. 3, $t_1$ represents the time at which a request for passive run driving is made, $t_2$ represents the time at which the engine clutch 30 is expected to be engaged with the engine 10, and $\Delta t$ represents the time period from the occurrence of a request for passive run driving until the engine clutch 30 is engaged with the engine 10.

Upon determining that the driver has requested downshifting, the controller 200 determines whether the vehicle is being driven in the passive run driving mode. The controller 200 may calculate a predicted vehicle speed $V_{new}$ at the time $t_2$ at which the engine clutch 30 is expected to be engaged with the engine 10 based on the current vehicle speed $V_0$ at the time at which a request for passive run driving is made, the deceleration of the vehicle, and the time $\Delta t$ taken for the engine clutch 30 to be engaged with the engine 10. In addition, the controller 200 may compare the reference vehicle speed $V_{Ref}$, which is calculated based on the target gear stage, with the predicted vehicle speed $V_{new}$.

As one example, in the conventional art, whether to start the engine 10 is determined by comparing the current vehicle speed $V_0$ with the reference vehicle speed $V_{Ref}$. Therefore, the engine 10 is turned on immediately after a request for passive run driving is made. However, as the vehicle speed continuously decreases, the current vehicle speed $V_0$ decreases below the reference vehicle speed $V_{Ref}$ ($V_0$ decreases to a speed similar to $V_{new}$) at the time $t_2$ at which the engine clutch 30 is expected to be engaged with the engine 10, and thus the engine 10 is turned off. Such on/off operation of the engine 10 within a short time gives a feeling of discomfort to the driver, wastes fuel due to starting of the engine 10, and wastes energy due to operation of the hybrid starter generator 40.

As another example, according to the embodiment of the present disclosure, whether to start the engine 10 is determined by comparing the predicted vehicle speed $V_{new}$, rather than the current vehicle speed $V_0$, with the reference vehicle speed $V_{Ref}$. Therefore, it is possible to prevent the engine 10 from being unnecessarily turned on. Since the predicted vehicle speed $V_{new}$, which is calculated by the controller 200 at the time $t_1$, at which a request for passive run driving is made, is less than the reference vehicle speed $V_{Ref}$, the controller 200 does not turn on the engine 10.

Figure 4:
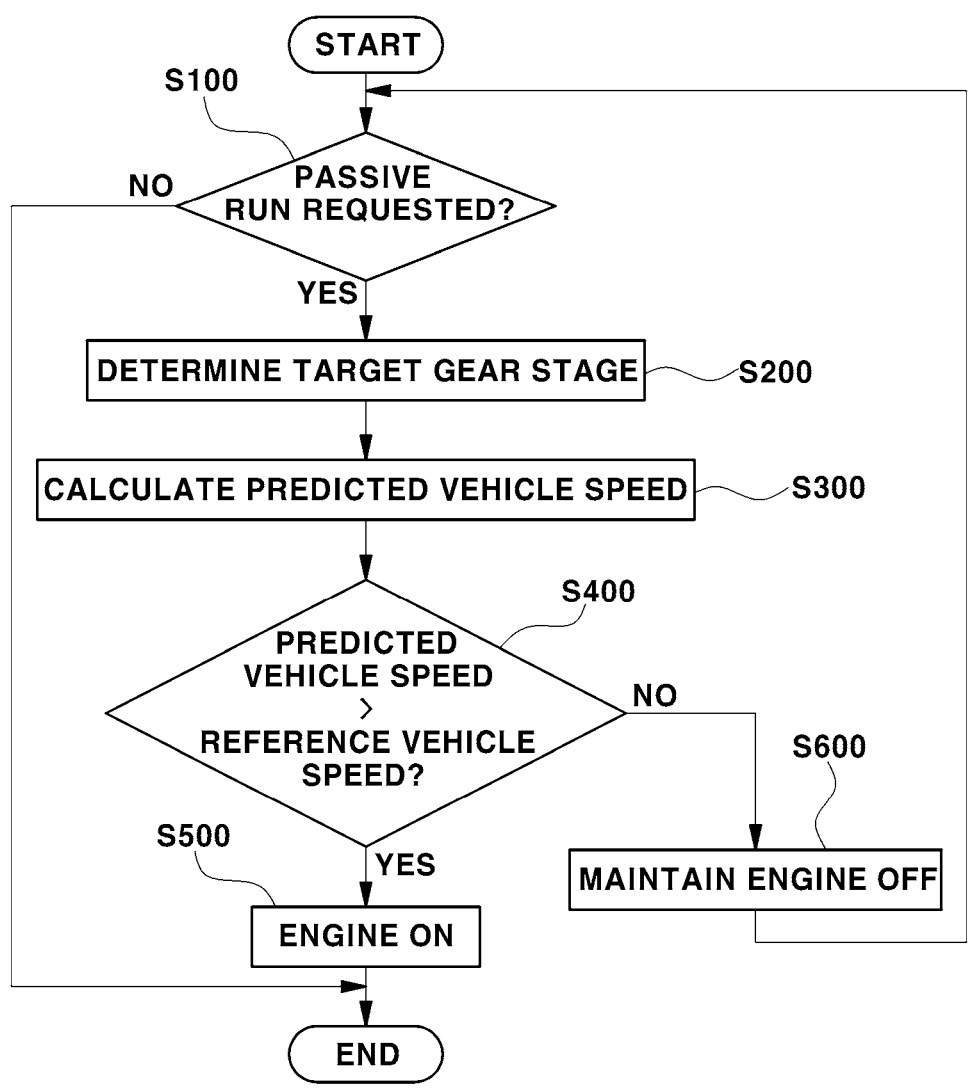
FIG. 4 is a flowchart showing a method of determining whether to start an engine according to an embodiment of the present disclosure.

FIG. 4 is a flowchart showing a method of determining whether to start an engine according to an embodiment of the present disclosure. For the sake of simplicity, a description of the same contents as above will be omitted.

Referring to FIG. 4, the controller may determine a passive run driving condition of the vehicle. The controller may determine whether the passive run driving condition of the vehicle is satisfied based on at least one piece of information among the SOC of the battery, the result of determining whether charging of the battery is restricted, and a request for downshifting at S100.

The controller may determine a target gear stage. Due to a driver's request for downshifting, the gear stage may be lowered below the gear stage at the time of a request for passive run driving. Simultaneously with the determination of the target gear stage, the controller may predict the time at which the engine clutch is expected to be engaged with the engine upon a request for passive run driving. In order to predict the time at which the engine clutch is expected to be engaged with the engine, the controller may predict the rate of increase in the RPM of the engine at the time of engagement of the engine clutch based on the current RPM of the motor, and may calculate a clutch engagement time by dividing the current RPM of the motor by the rate of increase in the RPM of the engine at S200.

The controller may calculate a predicted vehicle speed at the time at which the engine clutch is expected to be engaged with the engine based on the current vehicle speed upon a request for passive run driving. The predicted vehicle speed may be the sum of the current vehicle speed and a value obtained by multiplying the deceleration of the vehicle by the time taken for the engine clutch 30 to be engaged with the engine 10 at S300.

The controller may calculate a reference vehicle speed at the target gear stage, and may control whether to start the engine by comparing the predicted vehicle speed with the reference vehicle speed at S400.

When the predicted vehicle speed is greater than the reference vehicle speed, the controller may start the engine. When the predicted vehicle speed is greater than the reference vehicle speed, the controller needs to generate a sense of drag through engine braking. The controller may operate the hybrid starter generator in order to start the engine, and may engage the engine clutch with the engine after starting the engine. At this time, the controller may perform fuel cut control in order to improve the fuel efficiency of the vehicle at S500.

When the predicted vehicle speed is less than or equal to the reference vehicle speed, the controller may not start the engine. When the predicted vehicle speed is less than or equal to the reference vehicle speed, it may be advantageous to maintain the engine in the off state in terms of fuel efficiency of the vehicle and drivability by the driver. Therefore, the controller may maintain the engine in the off state at S600.

As is apparent from the above description, according to the embodiment of the present disclosure, it is possible to control engagement of an engine clutch and starting of an engine by comparing a predicted vehicle speed at the time of engagement of the engine clutch with the engine with a reference vehicle speed, which varies depending on a target gear stage. Accordingly, it is possible to prevent the engine from being turned off within a short time after the engine is turned on due to dissatisfaction with a passive run driving condition before the engine clutch is engaged with the engine. As such, since unnecessary on/off operation of the engine is prevented, it is possible to prevent the driver from feeling discomfort and to save the fuel used to start the engine and the energy used to operate a hybrid starter generator, thereby improving the fuel efficiency of the vehicle.

According to the embodiment of the present disclosure, since the target gear stage, the deceleration of the vehicle, the braking amount, and the extent of operation of the brake pedal are considered when setting the reference vehicle speed, which is a factor for determining whether to start the engine, the reference vehicle speed may be calculated based on predicted variation in the vehicle speed. If the reference vehicle speed is calculated based on the current gear stage of the vehicle in the situation in which the vehicle speed rapidly decreases and thus engine braking is not demanded, the reference vehicle speed is less than the predicted vehicle speed, which may cause the engine to be unnecessarily turned on. The present disclosure is capable of preventing this problem.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A system for determining whether to start an engine, the system comprising:
   an engine configured to provide a driving force for a vehicle through combustion of fuel;
   a motor configured to provide a driving force for the vehicle using electrical energy;
   an engine clutch connecting the engine and a drive shaft; and
   a controller configured to control engagement of the engine clutch and starting of the engine;
   wherein the controller calculates a predicted vehicle speed at a time of engagement of the engine clutch based on a current vehicle speed upon a request for passive run driving of the vehicle while the hybrid vehicle is driven in the EV driving mode;
   wherein the controller determines whether to start the engine by comparing the predicted vehicle speed with a reference vehicle speed;
   wherein the controller predicts a rate of increase in an RPM of the engine at a time of engagement of the engine clutch based on a current RPM of the motor; and
   wherein the time taken for the engine clutch to engage is obtained by dividing the current RPM of the motor by the rate of increase in the RPM of the engine.

2. The system of claim 1, wherein the predicted vehicle speed is a sum of the current vehicle speed and a value obtained by multiplying a deceleration of the vehicle by a time taken for the engine clutch to engage.

3. The system of claim 1, wherein the reference vehicle speed is a preset vehicle speed for each gear stage of the vehicle, and wherein the reference vehicle speed is preset to a lower speed for a lower gear stage.

4. The system of claim 1, wherein the controller calculates a vehicle speed error value according to a variation in a deceleration of the vehicle, a braking amount, or an extent of operation of a brake pedal, and
wherein the controller sets the reference vehicle speed as a value obtained by adding a preset vehicle speed for each gear stage of the vehicle to the vehicle speed error value.

5. The system of claim 4, wherein the controller calculates a vehicle speed error value that is proportional to an absolute value of the deceleration, and
wherein, when the deceleration has a negative value, the vehicle speed error value has a positive value.

6. The system of claim 4, wherein the controller calculates a vehicle speed error value that is proportional to the extent of operation of the brake pedal or the braking amount.

7. The system of claim 1, wherein the controller determines whether a passive run driving condition of the vehicle is satisfied based on at least one piece of information among a state of charge (SOC) of a battery of the vehicle, a result of determining whether charging of the battery is restricted, and a request for downshifting.

8. The system of claim 7, wherein the controller calculates a target gear stage to be engaged upon a request for downshifting by a driver, and
wherein the controller compares a preset reference vehicle speed corresponding to the target gear stage with the predicted vehicle speed.

9. The system of claim 7, wherein, when the SOC of the battery is a fully charged state or when charging of the battery is restricted, the controller compares a preset reference vehicle speed corresponding to a current gear stage of the vehicle with the predicted vehicle speed.

10. The system of claim 1, wherein the passive run driving is a driving state in which deceleration is generated through the engine, and
wherein, when the passive run driving continues, the deceleration of the vehicle is generated through engagement of the engine clutch.

11. The system of claim 1, wherein, when the predicted vehicle speed is less than or equal to the reference vehicle speed, the controller determines that the passive run driving is not necessary, and does not start the engine.

12. A method of determining whether to start an engine, the method comprising:
determining, by a controller, a passive run driving condition of a vehicle;
predicting a time at which an engine clutch is expected to be engaged with an engine upon a request for passive run driving;
calculating a predicted vehicle speed at the time at which the engine clutch is expected to be engaged with the engine based on a current vehicle speed upon a request for the passive run driving while the hybrid vehicle is driven in the EV driving mode;
determining whether to start the engine by comparing the predicted vehicle speed with a reference vehicle speed;
wherein the predicting the time at which the engine clutch is expected to be engaged with the engine upon a request for the passive run driving comprises:
predicting a rate of increase in an RPM of the engine at a time of engagement of the engine clutch based on a current RPM of a motor, and
calculating a time taken for the engine clutch to engage by dividing the current RPM of the motor by the rate of increase in the RPM of the engine.

13. The method of claim 12, wherein the determining the passive run driving condition comprises determining whether the passive run driving condition is satisfied based on at least one piece of information among a state of charge (SOC) of a battery of the vehicle, a result of determining whether charging of the battery is restricted, and a request for downshifting.

14. The method of claim 12, wherein the calculating the predicted vehicle speed comprises calculating the predicted vehicle speed by adding a value obtained by multiplying a deceleration of the vehicle by the time taken for the engine clutch to engage to the current vehicle speed.

15. The method of claim 12, wherein, in the controlling whether to start the engine, when the predicted vehicle speed is less than or equal to the reference vehicle speed, it is determined that the passive run driving is not necessary, and the engine is not started.

16. The method of claim 15, wherein the reference vehicle speed is a value obtained by adding a vehicle speed error value calculated according to a variation in a deceleration of the vehicle, a braking amount, or an extent of operation of a brake pedal to a preset vehicle speed for each gear stage of the vehicle.

17. The method of claim 16, wherein a gear stage at which the reference vehicle speed is calculated is a target gear stage to be engaged upon a request for downshifting by a driver.

18. The method of claim 16, wherein, when a request for the passive run driving is made due to a state in which a battery of the vehicle is fully charged or a state in which charging of the battery is restricted, the reference vehicle speed is a preset vehicle speed according to a current gear stage of the vehicle.

* * * * *